M. DALY.
BRAKE FOR CENTRIFUGAL MACHINES.
APPLICATION FILED SEPT. 25, 1915.
1,251,482.
Patented Jan. 1, 1918.
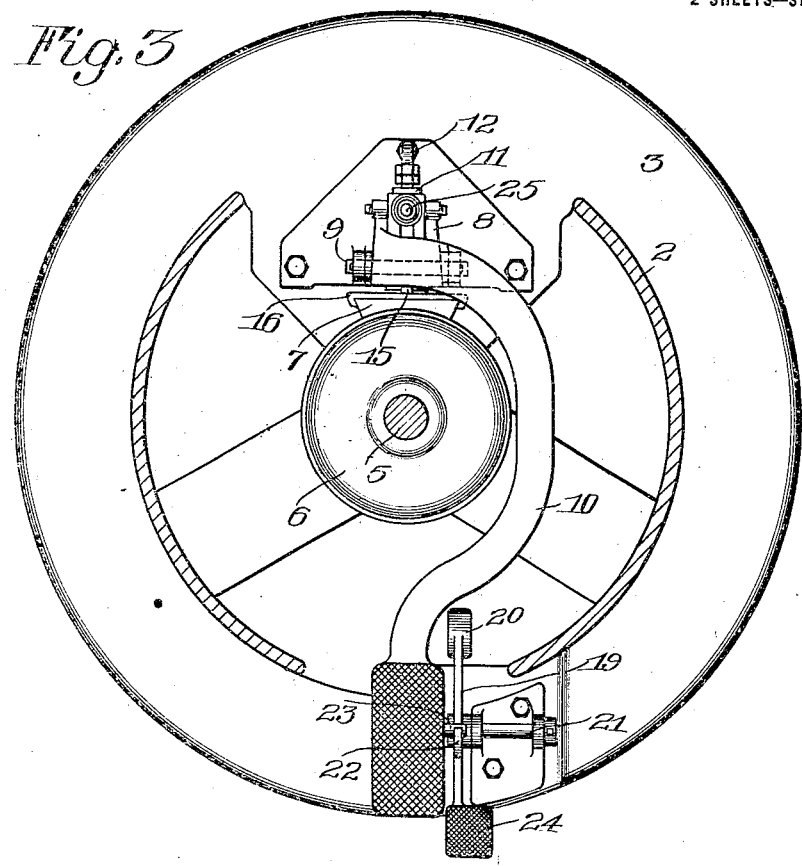
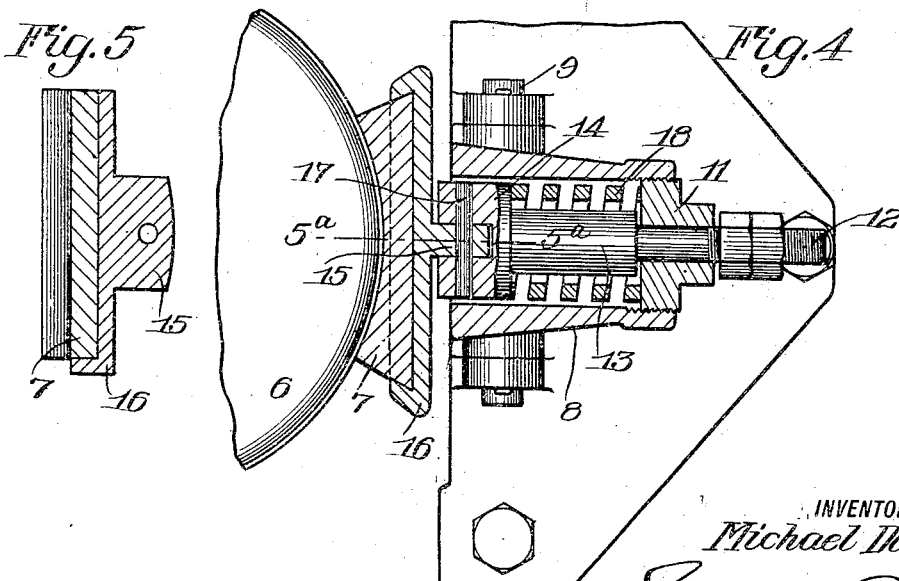
INVENTOR
Michael Daly
BY
his ATTORNEYS

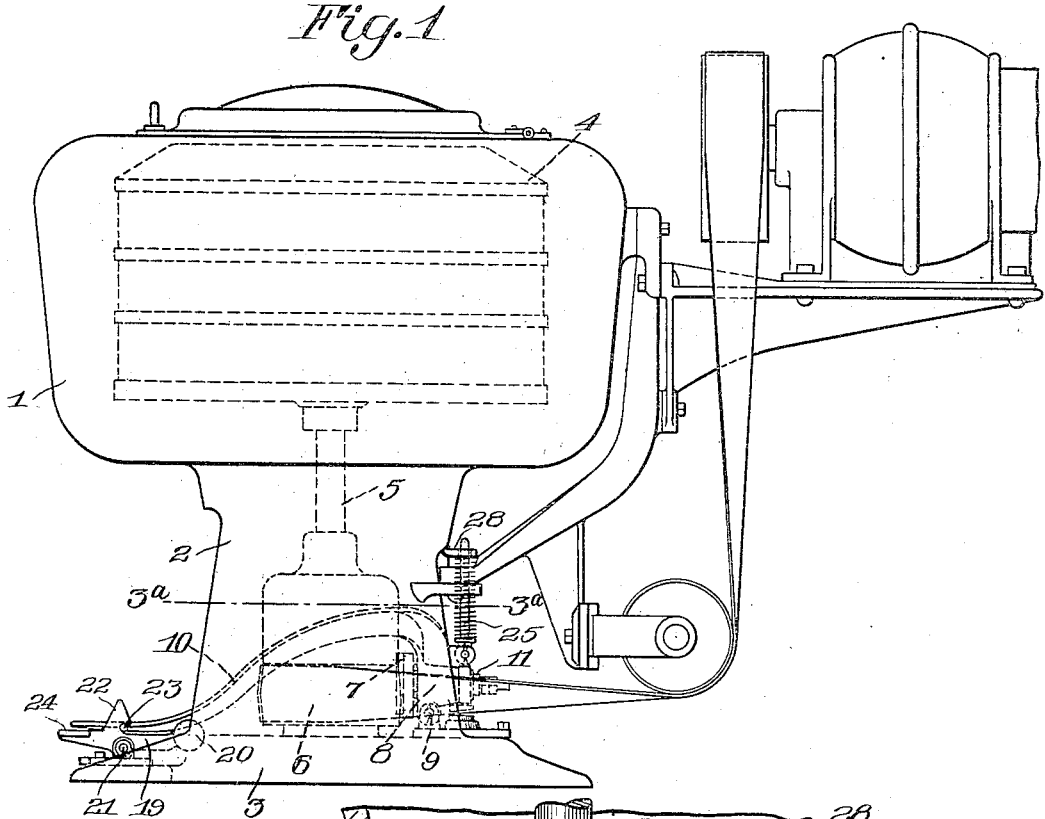

UNITED STATES PATENT OFFICE.

MICHAEL DALY, OF CINCINNATI, OHIO, ASSIGNOR TO THE AMERICAN LAUNDRY MACHINERY COMPANY, OF CINCINNATI, OHIO, A CORPORATION OF OHIO.

BRAKE FOR CENTRIFUGAL MACHINES.

1,251,482.  Specification of Letters Patent.  Patented Jan. 1, 1918.

Application filed September 25, 1915. Serial No. 52,590.

*To all whom it may concern:*

Be it known that I, MICHAEL DALY, of Cincinnati, in the county of Hamilton and State of Ohio, have invented certain new and useful Improvements in Brakes for Centrifugal Machines; and I do hereby declare the following to be a full, clear, and exact description of the same, reference being had to the accompanying drawings, forming a part of this specification, and to the reference-numerals marked thereon.

My invention has for its object to improve the construction of brakes for centrifugal machines, such for instances as are employed on extractors used for withdrawing liquid from a wet body by centrifugal action, or other apparatus of this general type. In its specific aspect the invention comprises an arrangement whereby a machine can be stopped quickly and with perfect control, in a manner that obviates any likelihood of twisting or straining the shaft or other rotary member with which the brake coöperates. An additional object of the improvement is to eliminate injury to the machine by improper application of the brake or by subjecting it to different degrees of pressure, and this purpose is attained by a peculiar construction and arrangement that affords a substantially constant pressure for applying the brake, and prevents the possibility of forcing or jamming or otherwise operating it so as to subject the rotating member or other parts of the machine to an undue strain. To these and other ends, the invention consists in certain improvements and combinations of parts, all as will be hereinafter more fully described, the novel features being pointed out in the claims at the end of the specification.

In the drawings:

Figure 1 is a side elevation showing an application of a preferred form of my invention to an extractor of the general type employed for laundry work;

Fig. 2 is an enlarged elevation of the brake mechanism;

Fig. 3 is a horizontal sectional view on line 3ª—3ª of Fig. 1;

Fig. 4 is a horizontal sectional view on the line 4ª—4ª of Fig. 2, and

Fig. 5 is a sectional view on the line 5ª—5ª of Fig. 4.

Similar reference numerals throughout the several views indicate the same parts.

In the present embodiment of the invention, which is primarily for illustrative purposes, and not intended to limit its application or scope, 1 designates the frame of a machine mounted on a pedestal 2 and base 3, and having arranged therein the rotating basket 4 which is carried by a vertical spindle 5. Fixed on the spindle 5 is a block 6 with which coöperates the brake shoe 7 that is controlled by the mechanism now to be described.

The brake member or shoe is mounted in a movable carrier which preferably comprises a casting 8 that is hollow and pivotally mounted on the bearing 9, while 10 is an operating lever or treadle through which movement of the carrier is effected. 11 designates a head having threaded engagement with the hollow casting 8, and provided with an opening to receive a slidably mounted spindle 12. The latter has an intermediate portion 13 and an enlarged portion or head 14 which is slotted to receive an extension 15 on a plate 16 that carries the brake shoe, the plate 16 being held on the head 14 by means of a pin 17. 18 designates a spring arranged between the head 11 on the carrier and the head 14 which is connected to the brake shoe, and serves to afford a resilient pressure means so that when the carrier is operated, its movement is first transmitted to the spring 18 and through it to the brake shoe, and while I have shown and described a spring for the purpose mentioned, the same object can be attained by any convenient form of resilient body that will prevent a direct pressure on the brake shoe. In order to carry out the full purpose of my improvement, it is necessary to limit the movement of the carrier with relation to the brake shoe, or in other words, to prevent the head 11 from ever contacting with the intermediate portion 13. To this end I employ a locking lever 19 weighted at 20 and pivoted at 21, its normal position appearing in Fig. 2. When the treadle 10 is depressed, it is prevented from moving beyond a predetermined point by the lever 19, and is held in its final position by the nose 22 which coöperates with the projection 23. 24 is a treadle for releasing the locking lever 19. By this means, it will be seen that the pressure that is applied to the brake shoe is necessarily limited to the pressure of the spring 18 which is substantially a constant one, so that no matter how lightly or heavily the treadle 10 is operated, the brake shoe is applied with the same degree of pressure, which is of an even and regular nature, bringing the rotating member gradually and promptly to a standstill, and effectively obviating any undue strain or twisting tendencies that are so likely to be caused by brake mechanisms of this general type.

Pivotally connected with the carrier is a rod 25 engaging an opening 26 in the frame and surrounded by a spring 27 which is arranged between the arm 28 on the frame and the collar 29 upon the rod. When the brake is applied, the spring 27 is compressed and upon releasing the brake operating lever said spring returns the parts to their normal position.

I claim as my invention:

1. A brake mechanism including a brake shoe, a pivotally arranged carrier on which the shoe is movably mounted, a spring disposed between the shoe and a part of the carrier and acting to effect a yieldable pressure on the shoe, and means for limiting movement of the carrier whereby to prevent it from operatively engaging the shoe except through said spring.

2. A brake mechanism including a brake shoe, a pivoted carrier, an operating lever connected to the carrier, a rod connected to the brake shoe and slidably disposed in the carrier, the rod having an enlargement, and a spring arranged between said enlargement and the carrier, and serving to apply yieldable pressure to the shoe.

MICHAEL DALY.

Witnesses:
Jos. H. Speller,
H. H. Gindele.

Copies of this patent may be obtained for five cents each, by addressing the "Commissioner of Patents. Washington, D. C."